Feb. 25, 1936.  H. F. PARKER ET AL  2,031,730

BRAKE

Original Filed May 21, 1930

INVENTOR.
BRYAN E. HOUSE
HUMPHREY F. PARKER
BY
ATTORNEY

Patented Feb. 25, 1936

2,031,730

UNITED STATES PATENT OFFICE 2,031,730

BRAKE

Humphrey F. Parker, Detroit, Mich., and Bryan E. House, South Bend, Ind., assignors to Bendix Brake Company, South Bend, Ind., a corporation of Illinois Original application May 21, 1930, Serial No. 454,250. Divided and this application October 16, 1934, Serial No. 748,482

8 Claims. (Cl. 188—79.5)

This invention relates to brakes, and is illustrated as embodied in an internal expanding brake for an automobile. An object of the invention is to provide such a brake with a rugged and easily operated, but simple and inexpensive, means for adjusting it for wear, and for use in initially adjusting the brake accurately with respect to the drum when first installed.

In one desirable arrangement, manufacture of the brake shoes is also simplified by eliminating the use of sockets and other special parts attached to the shoes, and in lieu thereof forming the adjusting device for direct engagement with the ends of the webs of the shoes. In the illustrated embodiment, the ends of the shoe webs are rounded, to have rolling thrust engagement with the ends of the adjusting device, and the ends of the adjusting device are slotted to embrace the ends of the shoe webs and maintain the parts in alignment. The webs may also have projecting lugs at their ends, to position the adjusting device radially of the shoes.

Preferably our novel brake adjusting device includes a pair of end sockets, which may be formed as described above to interengage pivotally with the ends of the shoe webs, and one or both of which are threaded or otherwise formed adjustably to receive the ends of a connection such as a part having a central portion adapted to be operated to effect the desired adjustment. We illustrate this part as having right-and-left threaded ends seated in the above-described sockets, with the central portion formed as a flange having teeth or the like engageable with a tool inserted through an opening in the backing plate.

According to one feature of the invention, which is very desirable although not essential as to its adjustment-locking feature, the adjustment is yieldingly held locked in adjusted position by interengagement of the above mentioned teeth with a spring which is tensioned between the shoes and which also serves to hold the shoes and the adjustment in assembled relation.

Figure 1:
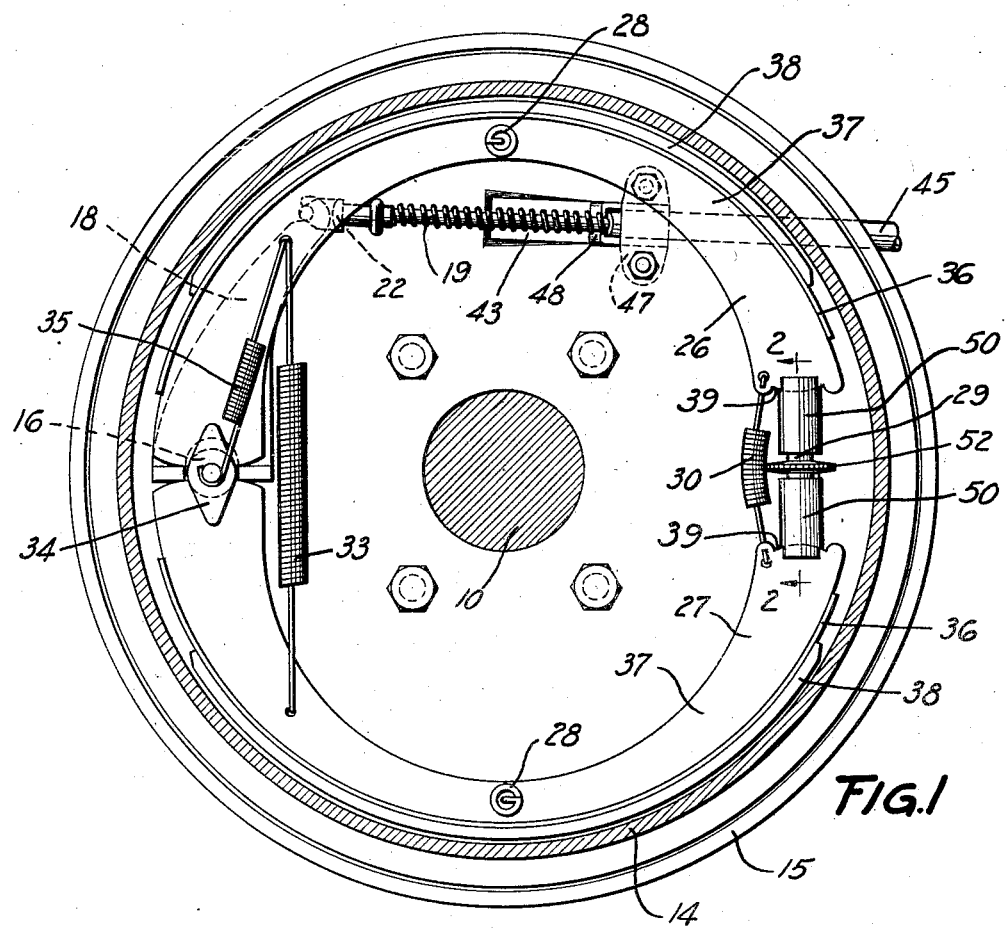
Figure 2:
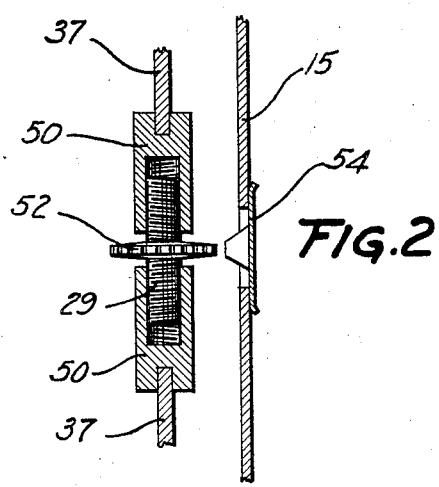

The above and other objects and features of the invention, including various novel combinations of parts and desirable particular constructions, will be apparent from the following description of the illustrative embodiment shown in the accompanying drawing, in which:

Figure 1 is a vertical section through the brake, just inside the head of the brake drum, and showing the shoes in side elevation; and Figure 2 is a partial section, on the line 2—2 of Figure 1 through the novel adjustment.

The illustrated brake is covered by our application No. 454,250, filed May 21, 1930, of which the present application is a division. As illustrated, it includes, suitably supported with respect to an axle or wheel spindle or the like 10 and operated by a floating cam 18 connected to an operating cable or other means 19 (shown connected to lever 18 by a fitting 22), a brake including a rotatable drum 14 and a backing plate or other support 15 carrying shoes 26 and 27 engageable with a single anchor 16. Suitable steady rests 28 may be provided.

The brake is shown provided with a return spring 33 and an unbalancing auxiliary spring 35. Each of the shoes 26 and 27 is formed with a web 37 welded or otherwise secured to a rim 36 carrying the friction lining 38.

The cable 19, if used as the applying medium, preferably forms part of a Bowden control comprising a flexible conduit 45, the end of which is shown as engaging a fitting 47 having an abutment 48 engaging the conduit at the point where cable 19 passes through the backing plate. The cable inside the backing plate passes over an inclined ramp 43.

According to the present invention, the shoes are adjustably connected by a novel device, preferably formed for engagement with the ends of the webs 36. In the illustrated embodiment, the notches 39 are rounded for pivotal engagement with the ends of sockets or the like 50, which are preferably slotted to embrace the ends of the webs 37. The notches 39 terminate in lugs which confine the sockets 50 against any shifting radially of the shoes.

The sockets 50 are internally threaded, or otherwise formed, for adjustable engagement with an intermediate part such as a screw 29, shown as having its ends right and left threaded to be received in the sockets 50.

The intermediate part of the double screw 29, between the sockets 50, is provided with operating means such as a flange 52 formed with peripheral teeth or projections adapted for engagement with the end of a screw driver or other tool inserted through an opening in the backing plate. The opening may have a suitable cover 54.

The screw 29 or its equivalent may, if desired, be yieldingly locked by interengagement of the peripheral teeth of flange 52 with a spring 30 tensioned between the webs of the two shoes, and serving also to hold the shoes and the adjusting device 29—50 in assembled relation.

While one illustrative embodiment has been described in detail, it is not our intention to limit the invention to that particular embodment, or otherwise than by the terms of the appended claims.

We claim:

1. A brake comprising shoes, threaded sockets disconnectedly engaging the ends of the shoes, an adjusting member having its opposite ends threaded into said members, and a spring tensioned between the shoes adjacent the sockets and holding the shoes against the sockets.

2. A brake comprising shoes having webs formed at their ends with rounded notches, an adjustment device having slotted ends embracing the ends of said webs and disconnectedly and pivotally engaging said notches, and a spring tensioned between the shoes and holding them against said device.

3. A brake comprising shoes having webs, an adjustment device having slotted ends embracing and disconnectedly engaging the ends of said webs, and a spring tensioned between the shoes and holding them against said device.

4. A brake comprising shoes, an adjusting device engaging and arranged between the shoe ends and having an operating flange between said ends, and a spring tensioned between said shoes and yieldingly engaging and locking said flange.

5. A brake comprising shoes, an adjusting device engaging and arranged between the shoe ends and having an operating flange formed with peripheral teeth and arranged between said ends, and a spring tensioned between said shoes and yieldingly engaging said teeth and locking said adjusting device.

6. A brake comprising shoes, an adjusting device engaging and arranged between the shoe ends and having an operating flange between said ends, and a spring tensioned between said shoes and yieldingly engaging and locking said flange, said device comprising a screw having said flange between its ends and having on its ends on opposite sides of said flange sockets engaging said shoes.

7. A brake comprising shoes, an adjusting device engaging and arranged between the shoe ends and having an operating flange formed with peripheral teeth and arranged between said ends, and a spring tensioned between said shoes and yieldingly engaging said teeth and locking said adjusting device, said device comprising a screw having said flange between its ends and having on its ends on opposite sides of said flange sockets engaging said shoes.

8. A brake comprising a pair of shoes having webs, and an adjustment device between the shoes including a pair of members having at their outer ends slots embracing the webs of the corresponding shoes and means between said members for forcing them apart lengthwise to adjust the brake for wear, the shoe webs being loosely held in said slots and movable relatively thereto, in combination with a spring tensioned between the shoes and holding them yieldingly against said device.

HUMPHREY F. PARKER.
BRYAN E. HOUSE.